United States Patent Office 2,700,674
Patented Jan. 25, 1955

2,700,674

PROCESS FOR THE PREPARATION OF A METHYL-KETONE RELATED TO ESTRONE

Leon Velluz and Georges Muller, Paris, France, assignors to Les Laboratoires Francais de Chimiotherapie, Paris, France, a body corporate No Drawing. Application February 20, 1952, Serial No. 272,706

Claims priority, application France January 2, 1948

5 Claims. (Cl. 260—397.4)

This invention relates to 17-methyl ketone compounds derived from substances of the cyclopentanopolyhydrophenanthrene series, and more particularly to methyl ketones derived from estrone, and to derivatives of said methyl ketones, and includes intermediates useful in the synthesis of such methyl ketones.

This application is a continuation-in-part of our prior copending application Serial No. 66,136, filed December 18, 1948, now abandoned.

The methyl ketone compounds according to this invention may be represented by the structural formula:

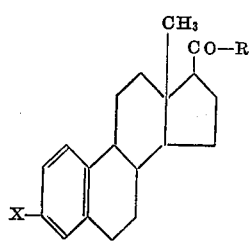

wherein R is a methyl group and X a member of a group selected from the groups, consisting of a hydroxyl group and a group convertible, by hydrolysis, into a hydroxyl group, such as an ester group.

These novel methyl ketone compounds, in addition to their utility in the synthesis of useful related substances, are physiologically active and may be employed in human or veterinary medicine as estrogenic substances and also in the treatment of certain types of malignant tumors, such as prostatic carcinoma.

In general terms, the synthesis of these novel compounds is effected as follows: estrone is treated with an acylating agent to convert the 3-hydroxy group to an acyloxy group; the reaction product is then reacted with hydrogen cyanide whereby the 17-keto group is converted to a cyanohydrin group; this compound is then treated with a dehydrating agent to split off water between the carbon atoms 16 and 17 and to produce the corresponding nitrile with an unsaturated linkage between carbon atoms 16 and 17 of the ring system and a nitrile substituent in 17-position. This last mentioned reaction product, after being reacted with Grignard reagent followed by conversion to the corresponding ketimine and hydrolysis, yields the corresponding 17-methyl ketone compound, unsaturated in the linkage between the carbon atoms in 16- and 17-positions of the ring system and with a —CO—CH$_3$ substituent in 17-position. Said unsaturated methyl ketone compound is then hydrogenated to cause addition of hydrogen solely to the Δ16,17-double bond of the ring system, yielding the desired saturated methyl ketone compound of the formula set forth above. Derivatives of the 3-hydroxy group of said methyl ketone, such as the acyloxy derivatives, are obtained in the course of the above described reaction by subsequent acylation of the 3-hydroxy group in the Δ16,17-unsaturated as well as in the saturated final 17-methyl ketone.

The synthesis may be represented by the following formulas, X being acyloxy and Hal being a halogen:

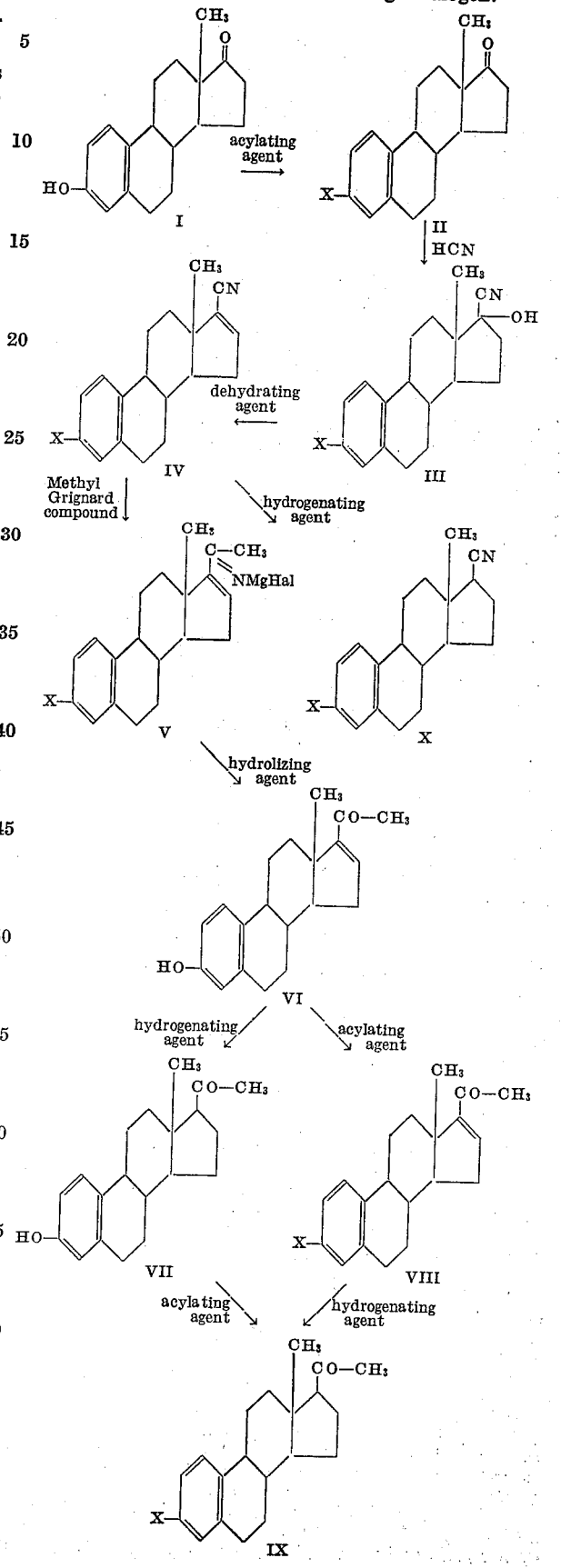

As acylating agents there are preferably used acid anhydrides and acid halogenides. One may, however, employ the acids themselves, especially in the presence of catalysts capable of accelerating splitting off of water. Especially suitable acylating agents are acetic acid anhydride or acetyl chloride, preferably in the presence of a tertiary base, such as pyridine, diethyl aniline, quinoline and the like, and, in the case of the acid chloride, of an alkaline agent, such as sodium hydroxide, carbonate, bicarbonate and the like. It is also possible, first to produce a salt, preferably an alkali salt of the phenolic hydroxyl group in estrone, and then to react said salt with an acid halogenide. One may furthermore proceed by reacting the phenolic compound and the corresponding acid or its alkali salt in the presence of phosphorus oxychloride, phosphorus pentachloride and the like. Other methods of acylating said phenolic starting materials, such as estrone or the unsaturated or saturated methyl ketones obtained according to this invention, as they are known in the art, may also be used. In the place of acetic acid and its anhydride or chloride, other aliphatic as well as aromatic and heterocyclic acids and their anhydrides and halogenides may be reacted, such as propionic acid, butyric acid, valeric acid, stearic acid, palmitic acid, oleic acid, oxalic acid, malonic acid, adipic acid, acrylic acid, maleic acid, fumaric acid, or substituted aliphatic acids, such as chloro acetic acid, lactic acid, tartaric acid, malic acid, citric acid and others. Cycloaliphatic acids and their anhydrides and halogenides, such as saturated and unsaturated cyclopentane carboxylic acids, cyclohexane carboxylic acids and the like may also be used. The most suitable aromatic carboxylic acid or its reactive derivative which may be reacted according to this invention, is benzoyl chloride, but other aromatic acids and their halogenides or anhydrides, such as substituted benzoic acids like p-nitrobenzoyl chloride, m-nitro benzoyl chloride, the halogenides of methyl benzoic acids, phenyl acetic acid, cinnamic acid, hydrocinnamic acid, phthalic acid, salicylic acid, anthranilic acid, hippuric acid, mandelic acid and others may also be employed. Suitable heterocyclic acids are, for instance, nicotinic acid and other pyridine carboxylic acids, furane-2-carboxylic acid, quinoline carboxylic acids and others.

To produce the cyanohydrin compound, hydrocyanic acid as such is added to the ketonic starting material. Said hydrocyanic acid may also be produced in statu nascendi, for instance, by using a mixture of an alkali cyanide and an organic acid, such as potassium cyanide and acetic acid.

The dehydration of the cyanohydrin compound to the corresponding nitrile compound is carried out in a manner known per se by means of agents capable of splitting off water. Phosphorus halogenides, such as phosphorus oxychloride, preferably in a solvent capable of binding halogen hydride, such as a tertiary base like pyridine, has proved to be especially suitable.

As Grignard reagent, the magnesium compounds of methyl halogenides, such as methyl magnesium bromide are preferably used. It is, of course, possible to react the nitrile with other suitable organo-metallic compounds, such as zinc methyl, lithium methyl and the like.

Hydrolysis of the Grignard reaction product of the nitrile is effected, for instance, by heating with inorganic or organic acids, such as alcoholic sulfuric acid, aqueous ammonium chloride solution, glacial acetic acid, dilute aqueous acetic acid and others.

The Δ16,17-double bond in the unsaturated ketone obtained thereby is hydrogenated by any known means capable of adding hydrogen to and, thereby, saturating a double bond. In particular, it is recommended to employ catalytically activated hydrogen. As catalysts there are used such catalysts which do not cause hydrogenation of aromatic compounds, i. e. catalysts of comparatively mild activity, especially activated nickel catalysts and preferably Raney nickel which is employed at ordinary pressure and room temperature in neutral or weakly alkaline medium.

It is, of course, also possible to first hydrogenate the unsaturated nitrile to the corresponding saturated nitrile, to react said nitrile with a methyl Grignard compound, to hydrolyze the ketimine obtained thereby and, if required, to acylate the saturated methyl ketone.

In the course of this reaction new and valuable intermediate and final products are obtained, namely the cyanohydrin of Formula III and its 3-acyloxy derivatives, the unsaturated nitrile of Formula IV and its 3-acyloxy derivatives, and the saturated and unsaturated 17-methyl ketones of Formulas VII and VI and their 3-acyloxy derivatives.

The following examples describe in detail the synthesis of the intermediate and final products according to this invention as mentioned above.

EXAMPLE 1

*3-acetoxy-17-keto-Δ-1,3,5-estratriene (estrone acetate)* (II)

3 g. of estrone (I) are dissolved in 20 cc. of pyridine and 15 cc. of acetic acid anhydride are added to said solution. The mixture is heated under reflux at 105° C. on an oil bath for an hour and a half. The reaction mixture is cooled, 200 cc. of water and thereafter 10 cc. of methanol are added, and the solution is extracted with ethyl acetate. The extract is acidified to a pH of 3.0 by the addition of dilute sulfuric acid (1:5). The estrone acetate solution is washed with water, dried, and distilled to dryness. The residue is recrystallized from ethanol. The pure estrone acetate (II) obtained thereby has a melting point of 123–124° C. $(\alpha)_D = +128°$; ($CHCl_3$, C=0.5%).

*3-acetoxy-17-cyanohydrin-Δ1,3,5-estratriene* (III)

3 g. of estrone acetate (II) obtained as described above, are dissolved in 65 cc. of ethanol and 25 cc. of acetic acid. 9 g. of potassium cyanide are added to said solution. The reaction mixture is then agitated for a period of 24 hours. Water is added and the reaction product is extracted with benzene. The benzenic solution is washed with water, dried and distilled to dryness. The residue is recrystallized from ethyl acetate. The pure cyanohydrin (III) has a melting point of 197–198° C. $(\alpha)_D = +21°$; ($CHCl_3$, C=1%).

*3-acetoxy-17-cyano-Δ-1,3,5,16-estratetraene* (IV)

1 g. of the cyanohydrin (III) obtained as described above, 3 cc. of anhydrous pyridine and 1 cc. of phosphorus oxychloride are placed into a heavy-walled glass tube. The tube is sealed and heated for an hour and a half at a temperature of 150° C. in an oil bath. After cooling to about 110° C. the tube is opened and the liquid poured on ice. The mixture is acidified to a pH of 3.0 by the addition of hydrochloric acid, and the reaction product is extracted by means of ethyl acetate. The extract is washed with water, dried and distilled to dryness. The residue is recrystallized from ethanol. The nitrile (IV) obtained has a melting point of 114–115° C. $(\alpha)_D = +72°$; ($CHCl_3$, C=0.5%).

*3-hydroxy-17-methylketo-Δ-1,3,5,16-estratetraene* (VI)

Into a flask provided with a reflux cooler, there are introduced 3 g. of magnesium and 40 cc. of ether. Thereto sufficient (15 to 20 g.) liquid methyl bromide is added in small amounts until the magnesium is completely dissolved. 1 g. of the nitrile (IV) obtained as described above, is added to said solution and the mixture is heated under reflux at a temperature between 50 and 60° C. for a period of 24 hours. The reaction mixture is poured on ice and the resulting magnesium compound is dissolved in 20 cc. of glacial acetic acid. After heating the reaction mixture at 100° C. for one hour, the precipitated ketimine is filtered off, dissolved in 20 parts by volume of glacial acetic acid; then 2 parts by volume of water are added, and heated under reflux at 100° C. for 15 minutes. Hydrolysis of the ketimine produces the unsaturated methylketone (VI) which contains no acetoxy group in 3-position, but a free hydroxy group and has a melting point of 256° C. $(\alpha)_D = +115°$; ($CHCl_3$, C=0.2%).

*3-hydroxy-17-methylketo-Δ1,3,5-estratriene* (VII)

1 g. of the unsaturated ketone (VI) obtained as described above is dissolved in 120 cc. of ethanol. 1 g. of Raney nickel catalyst is added to said solution and the pH of the same is adjusted to about 10.0 by the addition of a few drops of a sodium hydroxide solution. Hydrogen is then passed through the mixture until the saturated methylketone (VII) is formed. Said compound is precipitated from the reaction mixture by the addition of water. It is filtered off and recrystallized from ethanol.

Its melting point is 254° C. $(\alpha)_D = +151°$; (CHCl₃, C= 0.5%).

The 3-hydroxy-17-methyl keto-Δ1,3,5-estratriene obtained hereby is physiologically active and is employed therapeutically as mentioned above.

It is converted into its esters as described in the following examples.

EXAMPLE 2

80 mg. of 3-hydroxy-17-methyl keto-Δ1,3,5-estratriene (VII) are dissolved in 1 cc. of pyridine. The solution is heated with 0.7 cc. of acetic acid anhydride at 100° C. for about 3 hours. The reaction mixture is cooled and added drop by drop to cold dilute sulfuric acid. The acetoxy compound is extracted with ethyl acetate, the extract is washed with water, dried, and distilled to dryness. The 3-acetoxy-17-methyl keto-Δ1,3,5-estratriene (IX) is recrystallyzed from ethanol. Melting point: 108° C. Yield: about 80%.

EXAMPLE 3

150 mg. of 3-hydroxy-17-methyl keto-Δ1,3,5-estratriene (VII) are dissolved in 5 cc. of benzene. 0.5 cc. of pyridine and 0.5 cc. of benzoyl chloride are added thereto and the mixture is heated at 70° C. for about 30 minutes. The reaction mixture is worked up as described above, and yields, after recrystallization from ethanol, the benzoate of 3-hydroxy-17-methyl keto-Δ1,3,5-estratriene (IX), having a melting point of 170–172° C. $(\alpha)_D$: +110° C. +2° (in chloroform). Yield: about 80%.

In a similar manner, other esters of said 3-hydroxy-17-methyl keto-Δ1,3,5-estratriene (VII) are obtained, for instance, with propionyl chloride the propionate, with stearic acid chloride the stearate, and with other acids and their anhydrides or halogenides other esters of said methyl ketone, as heretofore set forth.

Likewise, when starting with other esters of estrone, such as the propionate, the valerate, the stearate, the benzoate, the nicotinate and the like, other 3-esters of the cyanohydrin of Formula III or of the unsaturated and saturated nitriles of Formulas IV and X respectively are obtained. On saponifying said esters the corresponding 3-hydroxy cyanohydrins or unsaturated or saturated nitriles are produced.

The unsaturated 3-hydroxy-17-methyl keto-Δ-1,3,5,16-estratetraene (VI) may also be converted into its acyloxy derivatives in a similar manner as described above whereby 3-acyloxy-17-methyl keto-Δ1,3,5,16-estratetraene compounds of Formula VIII are formed, which, in turn, may be hydrogenated to the saturated 3-acyloxy-17-methyl keto-Δ1,3,5-estratriene compounds of Formula IX.

Of course, many other changes and variations in the reaction compounds, the reaction conditions, the solvents used, the reaction temperature and duration, the methods of working up the reaction mixture and of isolating and purifying the reaction product and the like may be made by those skilled in the art in accordance with the principles set forth herein and in the claims annexed hereto.

We claim:

1. As a new product, a steroid compound selected from the group consisting of 3-hydroxy-17-methyl keto-Δ1,3,5-estratriene, 3-acetoxy-17-methyl keto-Δ1,3,5-estratriene, 3-benzoyloxy-17-methyl keto-Δ1,3,5-estratriene, and 3-hydroxy-17-methyl keto-Δ1,3,5,16-estratetraene.

2. As a new product, 3-acetoxy-17-methyl keto-Δ1,3,5-estratriene of the following formula

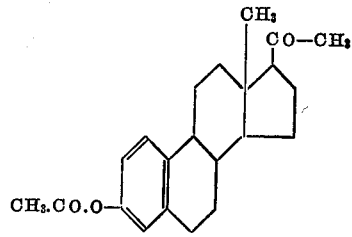

3. As a new product, 3-benzoyloxy-17-methyl keto Δ1,3,5-estratriene of the following formula

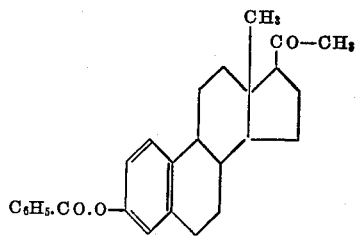

4. As a new product, 3-hydroxy-17-methyl keto-Δ1,3,5-estratriene of the following formula

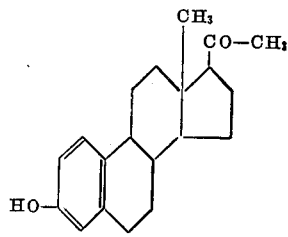

5. As a new product, 3-hydroxy-17-methyl keto-Δ1,3,5,16-estratetraene of the following formula

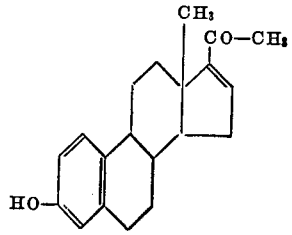

No references cited.